United States Patent [19]

Bahl et al.

[11] Patent Number: 5,497,447
[45] Date of Patent: Mar. 5, 1996

[54] SPEECH CODING APPARATUS HAVING ACOUSTIC PROTOTYPE VECTORS GENERATED BY TYING TO ELEMENTARY MODELS AND CLUSTERING AROUND REFERENCE VECTORS

[75] Inventors: Lalit R. Bahl, Amawalk; Ponani S. Gopalakrishnan, Yorktown Heights; Michael A. Picheny, White Plains, all of N.Y.; Peter D. DeSonza, San Jose, Calif.

[73] Assignee: International Business Machines Corporation, Armonk, N.Y.

[21] Appl. No.: 28,028

[22] Filed: Mar. 8, 1993
(under 37 CFR 1.47)

[51] Int. Cl.$^6$ ...................................................... G10L 9/00
[52] U.S. Cl. ........................ 395/2.54; 395/2.52; 395/2.64
[58] Field of Search ................................. 395/2.52–2.54, 395/2.6, 2.65, 2.64, 2.45, 2.66; 381/41–43

[56] References Cited

U.S. PATENT DOCUMENTS

| | | | |
|---|---|---|---|
| 4,852,173 | 7/1989 | Bahl et al. | 395/2.64 |
| 4,980,918 | 12/1990 | Bahl et al. | 381/43 |
| 5,033,087 | 7/1991 | Bahl et al. | 395/2.65 |
| 5,182,773 | 1/1993 | Bahl et al. | 381/41 |
| 5,267,345 | 11/1993 | Brown et al. | 395/2.64 |
| 5,276,766 | 1/1994 | Bahl et al. | 395/2.65 |
| 5,313,552 | 5/1994 | Lindsay | 395/2.54 |

OTHER PUBLICATIONS

T. W. Parsons, *Voice and Speech Processing*, McGraw–Hill, NY, NY, 1987, pp. 188–191.

Bahl et al. "Vector Quantization Procedure For Speech Recognition Systems Using Discrete Parameter Phoneme-Based Markov Word Models." *IBM Technical Disclosure Bulletin*, vol. 32, No. 7, Dec. 1989, pp. 320 and 321.

Jelinek, F. "Continuous Speech Recognition by Statistical Methods." *Proceedings of the IEEE*, vol. 64, No. 4, Apr. 1976, pp. 532–556.

*Primary Examiner*—David D. Knepper
*Assistant Examiner*—Michael A. Sartori
*Attorney, Agent, or Firm*—Whitham, Curtis, Whitham & McGinn; Robert Tassinari

[57] ABSTRACT

A speech coding apparatus in which measured acoustic feature vectors are each represented by the best matched prototype vector. The prototype vectors are generated by storing a model of a training script comprising a series of elementary models. The value of at least one feature of a training utterance of the training script is measured over each of a series of successive time intervals to produce a series of training feature vectors. A first set of training feature vectors corresponding to a first elementary model in the training script is identified. The feature value of each training feature vector signal in the first set is compared to the parameter value of a first reference vector signal to obtain a first closeness score, and is compared to the parameter value of a second reference vector to obtain a second closeness score for each training feature vector. For each training feature vector in the first set, the first closeness score is compared with the second closeness score to obtain a reference match score. A first subset contains those training feature vectors in the first set having reference match scores better than a threshold Q, and a second subset contains those having reference match scores less than the threshold Q. One or more partition values are generated for a first prototype vector frown the first subset of training feature vectors, and one or more additional partition values are generated for the first prototype vector from the second subset of training feature vectors.

17 Claims, 4 Drawing Sheets

PHONETIC MODEL (Pₙ)

SPEECH CODING APPARATUS HAVING ACOUSTIC PROTOTYPE VECTORS GENERATED BY TYING TO ELEMENTARY MODELS AND CLUSTERING AROUND REFERENCE VECTORS

BACKGROUND OF THE INVENTION

The invention relates to speech coding, such as for a speech recognition system.

The first step of speech recognition involves measuring the utterance to be recognized. A speech coding apparatus may measure, for example, the amplitude of the utterance to be recognized in one or more frequency bands during each of a series of time intervals (for example, ten-millisecond time intervals). Each measurement by the speech coding apparatus may be filtered, normalized, or otherwise manipulated to obtain desired speech information, with the result being stored as an acoustic feature vector.

In a speech recognition apparatus, the acoustic feature vectors produced by the speech coder from an utterance to be recognized are compared to acoustic models of words to find the best matched models. In order to simplify the comparison, the acoustic feature vectors may be converted from continuous variables to discrete variables by vector quantization. The discrete variables may then be compared to the acoustic models.

The acoustic feature vectors may be quantized by providing a finite set of prototype vectors. Each prototype vector has an identification (a label), and has one or more sets of parameter values. The value of an acoustic feature vector is compared to the parameter values of the prototype vectors to find the closest prototype vector. The identification (label) of the closest prototype vector is output as a coded representation of the acoustic feature vector.

Each prototype value may be obtained, for example, by averaging the values of a set of acoustic feature vectors corresponding to the prototype vector. Acoustic feature vectors may be correlated with prototype vectors, for example, by coding an utterance of a known training script by using an initial set of prototype vectors, and then finding the most probable alignment between the acoustic feature vectors and an acoustic model of the training script.

It has been found, however, that a single average for each prototype vector does not accurately model the prototype vector. A better model is obtained if each prototype vector consists of a mixture of partitions obtained by dividing the set of acoustic feature vectors corresponding to the prototype vector into a number of clusters.

The set of acoustic feature vectors corresponding to a prototype vector, may, for example, be grouped according to the context (for example, the preceding or following sounds) of each acoustic feature vector in the training script. Each context group may be divided into clusters of acoustic feature vectors arranged close to each other (for example, by K-means clustering), in order to adequately model each prototype vector. (See, *Clustering Algorithms,* John A. Hartigan, John Wiley & Sons, Inc., 1975.) Each cluster of acoustic feature vectors forms a partition. Each partition may be represented by values such as the average of the acoustic feature vectors forming the partition, and the covariance matrix of the acoustic feature vectors forming the partition (for simplicity, all off-diagonal terms of the covariance matrix may be approximated by zero.)

In order to adequately model each prototype vector in the manner described above, substantial amounts of training data from utterances of training scripts are needed, and substantial computing resources are needed to analyze the training data. Moreover, there is no correlation between clusters of acoustic feature vectors from one speaker to another, so prototype vector data from one speaker cannot be used to assist in generating prototype vectors for another speaker.

Further, in order to compare tile value of an acoustic feature vector to the parameter values of a prototype vector, the value of the acoustic feature vector must be matched to the parameter values of all partitions making up the prototype vector to produce a combined match score. It has been found, however, that typically the match score for the partition closest to the acoustic feature vector dominates combined match scores for all partitions. Therefore, the prototype match score can be approximated by the match score for the one partition of the prototype which is closest to the acoustic feature vector.

SUMMARY OF THE INVENTION

It is an object of the invention to provide a speech coding apparatus in which prototype vectors can be accurately generated with a relatively small amount of training data.

It is another object of the invention to provide a speech coding apparatus in which prototype vectors can be accurately generated with a relatively small consumption of computing resources.

It is a further object of the invention to provide a speech coding apparatus ill which partitions of a prototype vector for a new speaker can be correlated with partitions of the same prototype vector for other speakers, with the result that prototype vector data obtained from many other speakers can be used to assist in generating prototype vectors for the new speaker.

It is another object of the invention to provide a speech coding apparatus in which the value of an acoustic feature can be compared to the parameter values of the partitions of a prototype vector with reduced computation.

A speech coding apparatus and method according to the present invention measures the value of at least one feature of an utterance over each of a series of successive time intervals to produce a series of feature vector signals representing the feature values. A plurality of prototype vector signals are stored. Each prototype vector signal comprises at least two partitions and has all identification value. Each partition has at least one parameter value.

The feature value of a first feature vector signal is compared to the parameter value of at least one partition of each prototype vector signal to obtain prototype match scores for the first feature vector signal and each prototype vector signal. At least the identification value of the prototype vector signal having the best prototype match score is output as a coded utterance representation signal of the first feature vector signal.

The speech coding apparatus and method according to the invention generate the stored prototype vector signals by storing a model of a training script. The training script model comprises a series of elementary models from a finite set of elementary models. The value or at least one feature of a training utterance of the training script is measured over each of a series of successive time intervals to produce a series of training feature vector signals representing the feature values.

A first set of training feature vector signals corresponding to a first elementary model in the training script model is identified. At least first and second reference vector signals are stored. Each reference vector signal has at least one parameter value.

The feature value of each training feature vector signal in the first set is compared to the parameter value of the first reference vector signal to obtain a first closeness score for each training feature vector signal and the first reference vector signal. The feature value of each training feature vector signal in the first set is also compared to the parameter value of the second reference vector signal to obtain a second closeness score for each training feature vector signal and the second reference vector signal. For each training feature vector signal in the first set, the first closeness score for the training feature vector signal is compared with the second closeness score for the training feature vector signal to obtain a reference match score for each training feature vector signal and the first and second reference vector signals.

The training feature vector signals in the first set which have reference match scores better than a threshold Q are stored as a first subset. The training feature vector signal in the first set having reference match scores worse than the threshold Q are stored as a second subset. One or more partition values for a first prototype vector signal are generated from the first subset of training feature vector signals. One or more additional partition values for the first prototype vector signal are generated from the second subset of training feature vector signals.

In one aspect of the invention, each elementary model in the training script has a context comprising one or more preceding or following models in tire training script. The first set of training feature vector .signals corresponds to a first elementary model in the training script in a first context.

The parameter value of the first reference vector signal may, for example, comprise the mean of the feature values of a second set of training feature vector signals corresponding to an elementary model in the training script in a second context. The parameter value of the second reference vector signal may comprise the mean of the feature values of a third set of training feature vector signals corresponding to an elementary model in the training script in a third context different from the first and second contexts.

The partition values for the prototype vector signal may be generated by grouping each subset of training feature vector signals into one or more different clusters. For example, the first subset of training feature vector signals may be grouped into one or more different clusters by storing at least third and fourth reference vector signals. Each reference vector signal has at least one parameter value. The feature value of each training feature vector signal in the first subset is compared to the parameter value of the third reference vector signal to obtain a third closeness score for the training feature vector signal and the third reference vector signal. The feature value of each training feature vector signal in the first subset is also compared to the parameter value of the fourth reference vector signal to obtain a fourth closeness score for the training feature vector signal and the fourth reference vector signal. For each training feature signal in the first subset, the third closeness score for the training feature vector signal is compared with the fourth closeness score for the training feature vector signal to obtain a sub-reference match score for each training feature vector signal and the third and fourth reference vector signals.

The training feature vector signals in the first subset having sub-reference match scores better than a threshold Q' are stored as a first sub-subset. The training feature vector signals in the first subset having sub-reference match scores worse than the threshold Q' are stored as a second sub-subset. One or more partition values for the first prototype vector signal are generated from the first sub-subset of training feature vector signals. One or more additional partition values for the first prototype vector signal are generated from the second sub-subset of training feature vector signals.

Each partition value may comprise, for example, the mean of the feature values of the training feature value signals in a cluster. Each partition may further comprise the variance of the feature values of the training feature vector signals in a cluster.

The threshold Q may be equal to, for example, one.

The training script model may comprise, for example, a series of phonetic models. Each phonetic model comprises a series of elementary models. Each elementary model in the training script model has a phonetic context of preceding and following phonetic models. For generating the prototype vector signals, the first reference vector signal may comprise the mean of training feature vector signals corresponding to the first elementary model in a first phonetic context of preceding and following phonetic models. The second reference vector signal may comprise the mean of training feature vector signals corresponding to the first elementary model in a second phonetic context of preceding and following phonetic models different from the first context.

The value of at least of one feature of an utterance may be measured, ill part, with a microphone. The prototype vector signals may be stored in electronic readable memory.

By clustering acoustic feature vectors around reference vectors in the speech coding apparatus and method according to the present invention, prototype vector partitions call be obtained with less training data and less computing resources.

By clustering acoustic feature vectors around reference vectors which are correlated to different speakers (for example, which are correlated by context) according to the present invention, the partitions of a prototype vector for a new speaker can be correlated with partitions of the same prototype vector for other speakers, so prototype vector data obtained from many other speakers can be used to assist in generating prototype vectors for the new speaker.

By clustering acoustic feature vectors around reference vectors to obtain prototype vector partitions according to the present invention, the prototype vector partition which is closest to an acoustic feature vector can be found with less computing resources.

DESCRIPTION OF THE PREFERRED EMBODIMENTS

Figure 1:
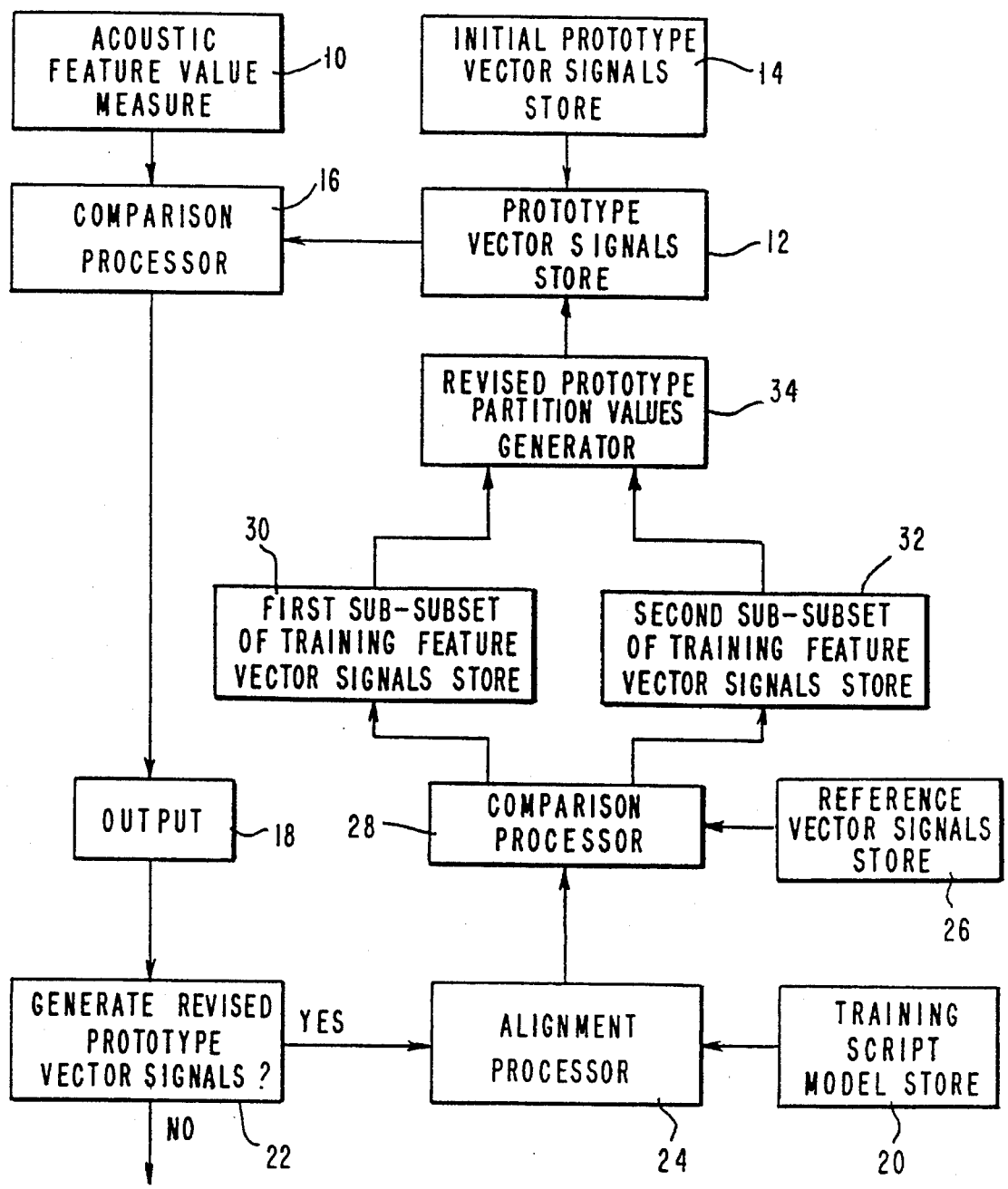
FIG. 1 is a block diagram of an example of a speech coding apparatus according to the invention.

FIG. 1 is a block diagram of an example of a speech coding apparatus according to the present invention. The apparatus includes an acoustic feature value measure 10 for measuring the value of at least one feature of an utterance over each of a series of successive time intervals to produce a series of feature vector signals representing the feature values. For example, the acoustic feature value measure 10 may measure the amplitude of the utterance in twenty frequency bands during each of a series of ten-millisecond time intervals. Each measurement by the speech coding apparatus may be filtered, normalized, or otherwise manipulated to obtain desired speech information, with the result being stored as an acoustic feature vector signal.

The speech coding apparatus further includes a prototype vector signals store 12 for storing a plurality of prototype vector signals. Each prototype vector signal comprises at least two partitions and has an identification value. Each partition has at least one parameter value.

Initially, tile prototype vector signals in store 12 are obtained from initial prototype vector signals store 14. The initial prototype vector signals may be obtained, for example, by the method described in U.S. Pat. No. 5,182,773 to Lalit R. Bahl et al entitled "A Speaker Independent Label Coding Apparatus". Each initial prototype vector signal need contain only one partition.

The speech coding apparatus further comprises a comparison processor 16 for comparing the closeness of the feature value of a first feature vector signal to the parameter value of at least one partition of each prototype vector signal to obtain prototype match scores for the first feature vector signal and each prototype vector signal. An output block 12 receives the prototype match scores from the comparison processor 16, and outputs at least the identification value of the prototype vector signal having the best prototype match score as a coded utterance representation signal of the first feature vector signal.

In order to generate revised prototype vector signals to be stored in prototype vector signals store 12, the speech coding apparatus further comprises training script model store 20 for storing a model of a training script. The training script model comprises a series of elementary models from a finite set of elementary models.

Figure 2:
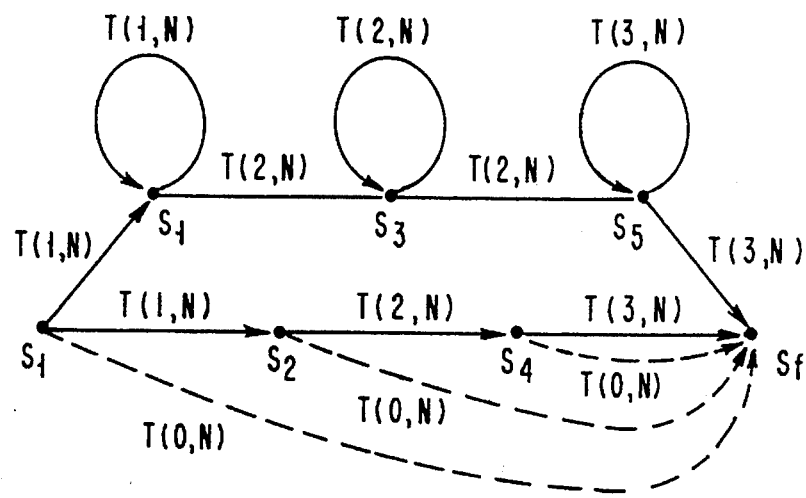
FIG. 2 schematically shows an example of an acoustic Markov model of a phoneme.

FIG. 2 schematically shows an example of all acoustic Markov model of a phoneme. In this example, the phonetic model $P_N$ has an initial state $S_i$, a final state $S_f$, and five intermediate states $S_1$ through $S_5$. Each state $S_i$ and $S_1$ through $S_5$ has one or more transitions to another state or back to the same state.

Each transition has a probability of occurrence, and has a probability of outputting one or more prototype vector signal identification values oil the occurrence of the transition.

The phonetic Markov model $P_n$, shown in FIG. 2 contains four types of elementary models $T(0,N)$, $T(1,N)$, $T(2,N)$ and $T(3,N)$. Each transition represented by elementary model $T(0,N)$ is a null transition and has a probability of zero of outputting prototype vector signal identification values. The transitions represented by elementary model $T(1,N)$ of the phonetic Markov model $P_N$ have a nonzero probability of outputting one or more prototype vector signal identification values. Each of the three transitions modelled by elementary model $T(1,N)$ have the same distribution of probabilities of outputting one or more prototype vector signal identification values. Similarly, ill this example, the elementary model $T(2,N)$ models four transitions in the phonetic model $P_N$, and the elementary model $T(3,N)$ models three transitions in the phonetic Markov model $P_N$.

Table 1 shows a hypothetical example of a portion of a training script and the phonetic models which form a model of the training script.

TABLE 1

| | TRAINING SCRIPT MODEL | | | |
|---|---|---|---|---|
| Training Script | A | speech | coding | apparatus . . . |
| Phonetic Models | P1 P82 | P19 P5 P82 P7 | P21 P96 . . . | . . . |

In this hypothetical example, tile word "A" is modelled with the phonetic models {P1 P82}. The word "speech" is modelled with the phonetic models {P19 P5 P82 P7}, and so on.

The parameters of the phonetic models (include the probabilities of occurrence of the transitions in the phonetic models, and the probabilities of output king one or more prototype vector signals identification values in the elementary models of the phonetic models. The parameters can be obtained by having a large number of different speakers utter a large number of known words, and by using, for example, the forward-backward algorithm. (See, for example, "Continuous Speech Recognition By Statistical Methods," Frederick Jelinek, *Proceedings of the IEEE*, Volume 64, No. 4, April 1976, pages 532–556.)

Returning to FIG. 1, when the utterance measured by the acoustic feature value measure 10 is a training utterance of the training script stored in training script model store 20, then a switch 22 provides both the coded utterance representation signals and the training feature vector signals corresponding to the training utterance of the training script to an alignment processor 24. The alignment processor 24 identifies a first set of training feature vector signals corresponding to a first elementary model in tile training script model.

Table 2 shows a hypothetical example of one-dimensional training acoustic feature vectors aligned with the training script elementary models of the training script phonetic models shown in Table 1.

TABLE 2

| ALIGNMENT OF ACOUSTIC FEATURE VECTORS WITH TRAINING SCRIPT | | |
|---|---|---|
| Training Script Phonetic Models | Training Script Elementary Models | Training Acoustic Feature Vectors |
| P1 | T(1,1) | 78 |
| P1 | T(2,1) | 51 |
| P1 | T(2,1) | 29 |
| P1 | T(3,1) | 93 |
| P82 | T(1,82) | 15 |
| P82 | T(1,82) | 20 |
| P82 | T(2,82) | 46 |
| P82 | T(3,82) | 38 |
| P19 | T(1,19) | 83 |
| P19 | T(2,19) | 9 |
| P19 | T(3,19) | 20 |
| P5 | T(1,5) | 21 |
| P5 | T(1,5) | 11 |
| P5 | T(2,5) | 46 |

TABLE 2-continued

ALIGNMENT OF ACOUSTIC FEATURE VECTORS WITH TRAINING SCRIPT

| Training Script Phonetic Models | Training Script Elementary Models | Training Acoustic Feature Vectors |
|---|---|---|
| P5 | T(2,5) | 64 |
| P5 | T(3,5) | 76 |
| P5 | T(3,5) | 6 |
| P82 | T(1,82) | 28 |
| P82 | T(1,82) | 90 |
| P82 | T(2,82) | 44 |
| P82 | T(3,82) | 23 |
| P82 | T(3,82) | 75 |
| P7 | T(1,7) | 19 |
| P7 | T(2,7) | 60 |
| P7 | T(3,7) | 87 |
| P21 | T(1,21) | 51 |
| P21 | T(2,21) | 15 |
| P21 | T(2,21) | 34 |
| P21 | T(2,21) | 13 |
| P21 | T(3,21) | 2 |
| P21 | T(3,21) | 47 |
| P96 | T(1,96) | 4 |
| P96 | T(1,96) | 86 |
| P96 | T(1,96) | 57 |
| . | . | . |
| . | . | . |
| . | . | . |

The alignment of the acoustic feature vectors with the training script elementary models may be obtained, for example, by using the Viterbi algorithm. (See, for example, "Continuous Speech Recognition by Statistical Methods," above).

Table 3 shows a hypothetical example of a first set of one-dimensional training feature vectors corresponding to a first elementary model T(1,1) of the phonetic model P1 in the training script model of Table 1.

TABLE 3

SET OF TRAINING FEATURE VECTORS CORRESPONDING TO ELEMENTARY MODEL T(1,1)

| Context | Training Script Elementary Model | Training Acoustic Feature Vectors | Closeness to Reference Vector A D(X,A) | Closeness to Reference Vector B D(X,B) | Reference Match Score [D(X,A)/ D(X,B)] | Assigned Subset |
|---|---|---|---|---|---|---|
| C(L12) | T(1,1) | 78 | 65 | 8 | 8.13 | B |
| C(L12) | T(1,1) | 42 | 29 | 28 | 1.04 | A |
| C(L12) | T(1,1) | 80 | 67 | 10 | 6.70 | B |
| C(L12) | T(1,1) | 22 | 9 | 48 | 0.19 | A |
| C(L12) | T(1,1) | 29 | 16 | 41 | 0.39 | A |
| C(L12) | T(1,1) | 61 | 48 | 9 | 5.33 | B |
| C(L12) | T(1,1) | 3 | 10 | 67 | 0.15 | A |
| C(L12) | T(1,1) | 72 | 59 | 2 | 29.50 | B |
| C(L12) | T(1,1) | 60 | 47 | 10 | 4.70 | B |
| C(L12) | T(1,1) | 85 | 72 | 15 | 4.80 | B |
| C(L12) | T(1,1) | 36 | 23 | 34 | 0.68 | A |

Reference Vector A = 13
Reference Vector B = 70
Threshold Q = 4

Each elementary model in the training script model has a context comprising one or more preceding or following models (such as phonetic models) ill the training script. In one aspect of the invention, the first set of training feature vector signals corresponds to a first elementary model in the training script in a first context. As shown in the hypothetical example of Table 3, above, the first set of training acoustic feature vectors corresponds to the training script elementary model T(1,1) in a hypothetical context designated C(L12).

The context features of the elementary models used for grouping sets of training feature vector signals may be, for example, manually selected. Alternatively, the context features may be automatically selected by tagging each feature vector signal corresponding to a prototype vector with its context, and by grouping the feature vector signals according to their context to optimize a selected evaluation function.

For example, the context of an elementary model may comprise the five phonemes preceding the elementary model in the training script and the five phonemes following the elementary model in the training script. For each set of training acoustic feature vectors corresponding to a single training script elementary model, there are a number of candidate context questions which divide the set of acoustic feature vectors into two subsets. For example, a candidate context question might be "Is the immediately preceding phoneme a consonant sound?" Each candidate question is scored with an evaluation function of tire subsets obtained from the question. The candidate context question corresponding to the best score is selected.

One suitable evaluation function E is given by Equation 1

$$E = L_1(\mu_1, \sigma_1) L_2(\mu_2, \sigma_2)$$

where $$L_a = \prod_{i=1}^{N} \text{Prob}[v_i | N(\mu_a, \sigma_a)] \quad [2]$$

In Equation 1, the evaluation function E is the product of the likelihood $L_1$ of the first subset of the acoustic feature vectors $v_i$ corresponding to the elementary model times the likelihood $L_2$ of the second subset of the acoustic feature vectors corresponding to the elementary model. Each likelihood $L_a$ is equal to the product of the probability of each acoustic feature vector $v_i$ in the subset given the Gaussian distribution $N(\mu_a, \sigma_a)$ of acoustic feature vectors in the subset, where $\mu_a$ is the mean of the acoustic feature vectors in the subset, and $\sigma_a$ is the standard deviation of the acoustic feature vectors ill the subset.

Each subset of acoustic feature vectors corresponding to a particular elementary model in a particular context (according to the selected context question obtained in tile manner described above) is further split by evaluating another set of candidate context questions, and then selecting the best context question. Each new subset of acoustic feature vectors is split using this method until either the number of feature vectors in a class falls below a threshold, such as 100 feature vectors, or the gain of information from splitting the subset falls below a threshold. The gain from splitting each subset may be estimated as $L_1 L_2/L_{1,2}$, where the likelihood $L_{1,2}$ is the likelihood of the unsplit subset of acoustic feature vectors from Equation 2. The threshold may be, for example, $10^{2.5}$.

Typically, a set of acoustic feature vectors corresponding to a single elementary model may be divided into 30 subsets corresponding to the elementary model in 30 different contexts of preceding and following phonemes.

Figure 3:
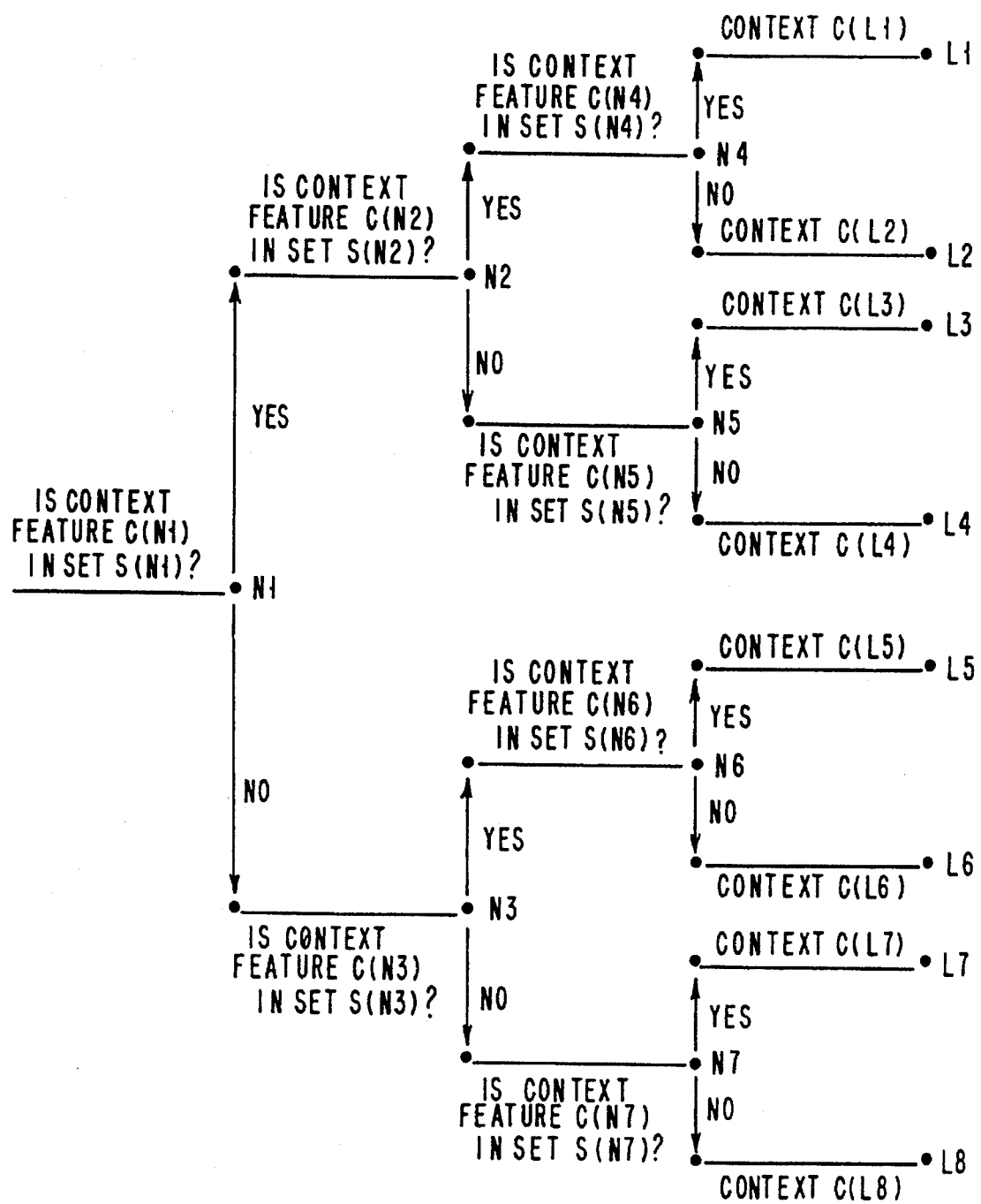
FIG. 3 schematically shows an example of a decision tree for identifying the context of an elementary model in a training script model according to the context of preceding and following phonetic models in the training script model.

FIG. 3 schematically shows an example of a hypothetical binary decision tree for identifying the context of an elementary model in a training script model. The decision tree is constructed using the context questions selected by the method described above at each node N of the tree. For a particular occurrence of an elementary model in the training script, the next context question asked depends on whether the prior context question is answered "Yes" or "No". All occurrences of an elementary model in the training script whose context questions terminate at the same leaf L of the decision tree have the same context.

Returning to FIG. 1, the speech coding apparatus further comprises a reference vector signals store 26 for storing at least first and second reference vector signals. Each reference vector signal has at least one parameter value.

A comparison processor 28 compares the feature value of each training feature vector signal in the first set to the parameter value of the first reference vector signal to obtain a first closeness score for each training feature vector signal and the first reference vector signal comparison processor 28 also compares the feature value of each training feature vector signal in the first set to the parameter value of the second reference vector signal to obtain a second closeness score for each training feature vector signal and the second reference vector signal. Finally, for each training feature vector signal in the first set, the comparison processor 28 compares the first closeness score for the training feature vector signal with the second closeness score for the training feature vector signal to obtain a reference match score for each training feature vector signal and the first and second reference vector signals.

In the hypothetical example of Table 3, above, the training acoustic feature vectors are compared with one-dimensional Reference Vectors A and B to obtain closeness scores for each training acoustic feature vector and Reference Vectors A and B. Also shown for this hypothetical example is a reference match score for each training feature vector. In this example, the reference match score is equal to the ratio of the closeness of the acoustic feature vector to Reference Vector A over the closeness of the acoustic feature vector to Reference Vector B.

For acoustic feature vectors and reference vectors having more than one dimension, the closeness scores may be the squared Euclidean distance.

A first subset of training feature vector signals store 30 contains the training feature vector signals in tile first set having reference match scores better than a threshold Q. A second subset of training feature vector signals store 32 contains training feature vector signals in the first set having reference match scores worse than the threshold Q.

Returning to the hypothetical example of Table 3, for a hypothetical threshold Q=4, each training acoustic feature vector is assigned to either a subset A having a reference match score less than the threshold Q=4, or is assigned to a subset B having a reference match score greater than the threshold Q=4.

Thereafter, a revised prototype partition values generator 34 generates one or more partition values for a first prototype vector signal from the first subset of training feature vector signals, and generates one or more additional partition values for the first prototype vector signal from the second subset of training feature vector signals. Each subset of training feature vector signals may be grouped into one or more different clusters.

Each partition value may comprise, for example, the mean of the feature values of the training feature vector signals in a cluster. Each partition value may further comprise the variance of tile feature values of the training feature vector signals in a cluster. Table 4 shows the mean and the variance corresponding to Partitions A and B in the hypothetical example of Table 3.

TABLE 4

| Prototype Vector Signal T(1,1) in Context C(L12) | | |
|---|---|---|
| | Mean | Variance |
| Partition A | 26.40 | 181.84 |
| Partition B | 72.67 | 88.56 |

Figure 4:
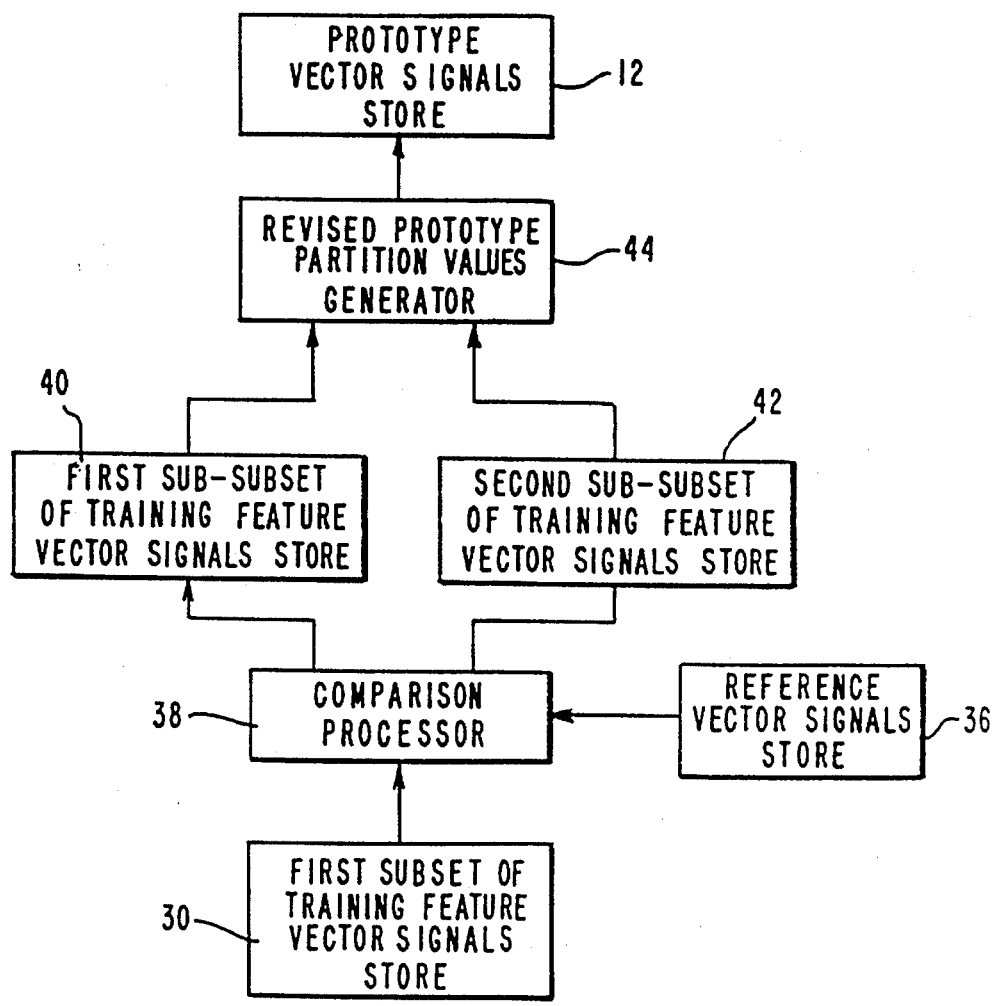
FIG. 4 is a block diagram of an example of the revised prototype partition values generator of FIG. 1.

FIG. 4 is a block diagram of an example of a revised prototype partition values generator 34 of FIG. 1. A reference vector signals store 36 stores at least third and fourth reference vector signals. Each reference vector signal has at least one parameter value. A comparison processor 38 compares the feature value of each training feature vector signal in the first subset of training feature vector signals store 30 (FIG. 1) to the parameter value of the third reference vector signal to obtain a third closeness score for the training feature vector signal and the third reference vector signal. Comparison processor 38 also compares the feature value of each training feature value signal in the first subset to the parameter value of the fourth reference vector signal to obtain a fourth closeness score for the training feature vector signals and the fourth reference vector signal. For each training feature vector signal in the first subset, the third closeness score for the training feature vector signal is compared with the fourth closeness score for the training feature vector signal to obtain a sub-reference match score for each training feature vector signal and the third and fourth reference vector signals.

The parameter values of the third and fourth reference vector signals may, for example, be identical to the parameter values of the first and second reference vector signals, respectively.

Still referring to FIG. 4, the revised prototype partition values generator 34 of FIG. 1 further includes a first sub-subset of training feature vector signals store 40 for storing training feature vector signals in the first subset having sub-reference match scores better than a threshold Q'. A second sub-subset of training feature vector signals store 42 stores the training feature vector signals in the first subset having sub-reference match scores worse than the threshold Q'.

A revised prototype partition values generator 44 generates one or more partition values for the first prototype vector signal from the first sub-subset of training feature vector signals, and generates one or more additional partition values for the first prototype vector signal from the second sub-subset of training feature vector signals.

The parameter value of the first reference vector signal may, for example, comprise the mean of the feature values of a second set of training feature vector signals corresponding to an elementary model in the training script in a second context. The second context may be the same as or different from the first context. The parameter value of the second reference vector signal may comprise the mean of the feature values of a third set of training feature vector signals corresponding to an elementary model in the training script in a third context different from the first and second contexts.

The reference vector signals stored in reference vector signals store 26 and reference vector signals store 36 may be selected, and the values of the thresholds Q may be obtained, for example, in the following manner. A known reference script containing a large number of words is uttered by a large number of different speakers. For each elementary model of the reference script all of the acoustic feature vectors corresponding to each occurrence of that elementary model in the reference script are identified. The context of each occurrence of that elementary model is also identified, for example using a decision tree like the tree of FIG. 3.

For each speaker S who uttered the reference script, the acoustic feature vectors associated with the speaker S and which are also associated with the selected elementary model are grouped according to the occurrences of the associated elementary model in the reference script. Each group $G_{S,C(Lj)}$ contains all of the acoustic feature vectors associated with the selected elementary model, the speaker S and the context C(Lj). Each group of acoustic feature vectors has a mean vector $M(G_{S,C(Lj)})$ which consists of the average of the acoustic lea Lure vectors within the group.

For each acoustic feature vector $X_{S,i}$ belonging to each speaker S and belonging to a group $G_{S,C(Lj)}$, and for a pair of contexts C(Lk) and C(Lk'), the ratio $$R(X_{S,i,k,k'}) = \frac{D[X_{S,i}, M(G_{S,C(Lk)})]}{D[X_{S,i}, M(G_{S,C(Lk')})]} \quad [3]$$

is computed. The function D may be, for example, the squared Euclidean distance between each acoustic feature vector $X_{S,i}$ and the mean vector $M(G_{S,C})$.

The ratios $R(X_{S,i})$ obtained from the preceding equation for the context pair C(Lk) and C(Lk'), and for all speakers S of the reference script are sorted from low to high or from high to low. The variable SL(H) denotes the Hth element on the sorted list, and N denotes the size of the list. For every index It in the range from 2 to N, a candidate threshold Q is defined as $$Q = \frac{SL(H-1) + SL(H)}{2} \quad [4]$$

For every speaker S, each acoustic feature vector $X_{S,i}$ in the group $G_{S,C(Lj)}$ is assigned into one of two sets depending on whether the ratio R(X) is less than or greater than the candidate threshold Q.

For each split obtained from a candidate value for the threshold Q, the benefit of the split is calculated using Equation 1, above. For the context pair C(Lk) and C(Lk'), tile value of Q which produced the split with the greatest benefit is stored. The benefit of the split is also stored.

For the same group $G_{S,C(Lj)}$ of acoustic feature vectors, and for each other context pair C(Lα) and C(Lβ), the optimal value of Q is found and the resulting benefit B is found. The context pair $C(L_{max})$ and $C(L'_{max})$ having the greatest benefit $B_{max}$ among all the context pairs, and the corresponding ratio $Q_{max}$ are then selected as the context groups for the reference vectors, and the reference match score threshold Q, respectively.

The group $G_{S,C(Lj)}$ of acoustic feature vectors is then divided into two subsets based on whether the reference match score for the feature vector is greater than or less than the selected reference match score threshold Q. Each subset may be further subdivided in a same way to obtain further context pairs for further reference vectors if there is sufficient data and sufficient benefit. If the benefit B does not exceed a selected benefit threshold, the subset is not subdivided.

For a new speaker, each reference vector comprises the mean of the feature values of a set of training feature vector signals produced by the new speaker and corresponding to an elementary model in the training script in a context corresponding to the reference vector.

In order to reduce the amount of computation required, the reference match score threshold Q may optionally be set equal to 1. This eliminates the search for the optimal threshold associated with each pair of candidate reference vectors.

As discussed above, the prototype match score for an acoustic feature vector and a prototype vector can be approximated by the match score of tile one partition of the prototype vector which is closest to the acoustic feature vector. A partition which is likely to yield the best match score can be found with less computation than matching the acoustic feature vector to every partition of the prototype vector by using a binary decision tree. Each pair of reference vectors used to partition the prototype vector is associated with one node of the decision tree. The decision tree in similar to FIG. 3, but with the question "Is the ratio $R(X_{S,i,k,k'})$ (of Equation 3) greater than Q?" replacing the context question at each node.

In the speech coding apparatus according to the invention, comparison processors 16, 28, and 38, alignment processor 24, and revised prototype partition values generators 34 and 44 may be suitably programmed special purpose or general purpose digital signal processors. Prototype vector signals stores 12 and 14, training feature vector signals stores 30, 32, 40, and 42, training script model store 20, and reference vector signals stores 26 and 36 may be electronic computer memory.

Figure 5:
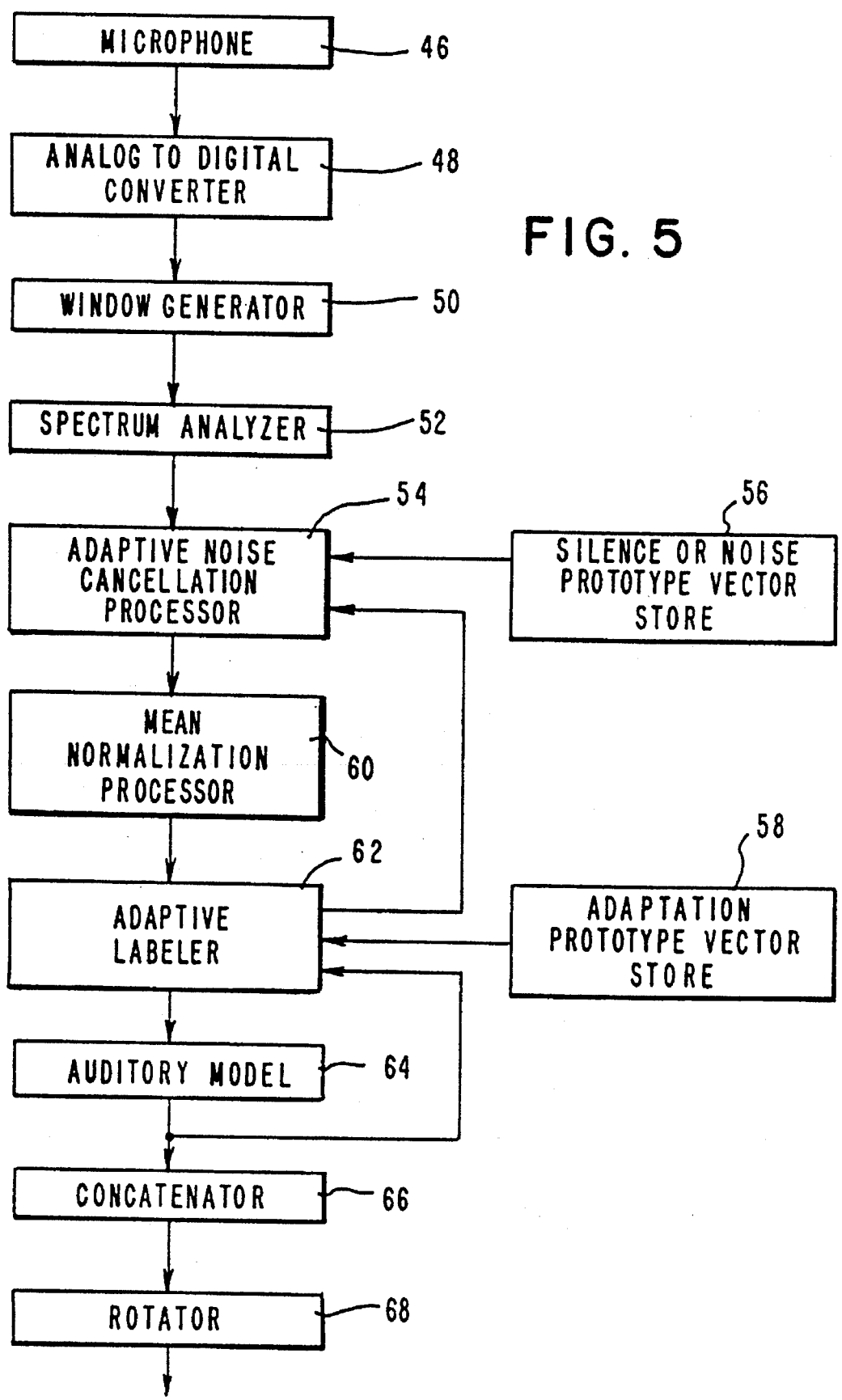
FIG. 5 is a block diagram of an example of the acoustic feature value measure of FIG. 1.

One example of an acoustic feature value measure is shown in FIG. 5. The measuring means includes a microphone 46 for generating an analog electrical signal corresponding to the utterance. The analog electrical signal from microphone 46 is converted to a digital electrical signal by analog to digital converter 48. For this purpose, the analog signal may be sampled, for example, at a rate of twenty kilohertz by the analog to digital converter 48.

A window generator 50 obtains, for example, a twenty millisecond duration sample of the digital signal from analog to digital converter 48 every ten milliseconds (one centisecond). Each twenty millisecond sample of the digital signal is analyzed by spectrum analyzer 52 in order to obtain the amplitude of the digital signal sample in each of, for example, twenty frequency bands. Preferably, spectrum analyzer 52 also generates a twenty-first dimension signal representing the total amplitude or total power of the twenty millisecond digital signal sample. The spectrum analyzer 52 may be, for example, a fast Fourier transform processor. Alternatively, it may be a bank of twenty band pass filters.

The twenty-one dimension vector signals produced by spectrum analyzer 52 may be adapted to remove background noise by an adaptive noise cancellation processor 54. Noise cancellation processor 54 subtracts a noise vector N(t) from the feature vector F(t) input into the noise cancellation processor to produce an output feature vector F'(t). The noise cancellation processor 54 adapts to changing noise levels by periodically updating the noise vector N(t) whenever the prior feature vector F(t-1) is identified as noise or silence. The noise vector N(t) is updated according to the formula $$N(t) = \frac{N(t-1) + k[F(t-1) - Fp(t-1)]}{(1+k)},\quad [5]$$

where N(t) is the noise vector at time t, N(t-1) is the noise vector at time (t-1), k is a fixed parameter of the adaptive noise cancellation model, F(t-1) is the feature vector input into the noise cancellation processor 54 at time (t-1) and which represents noise or silence, and Fp(t-1) is one silence or noise prototype vector, from store 56, closest to feature vector F(t-1).

The prior feature vector F(t-1) is recognized as noise or silence if either (a) the total energy of the vector is below a threshold, or (b) the closest prototype vector in adaptation prototype vector store 58 to the feature vector is a prototype representing noise or silence. For the purpose of the analysis of the total energy of the feature vector, the threshold may be, for example, the fifth percentile of all feature vectors (corresponding to both speech and silence) produced in the two seconds prior to the feature vector being evaluated.

After noise cancellation, the feature vector F'(t) is normalized to adjust for variations in the loudness of tile input speech by short term mean normalization processor 60. Normalization processor 60 normalizes the twenty-one dimension feature vector F'(t) to produce a twenty dimension normalized feature vector X(t). The twenty-first dimension of the feature vector F'(t), representing the total amplitude or total power, is discarded. Each component i of the normalized feature vector X(t) at time t may, for example, be given by the equation $$X_i(t) = F'_i(t) - Z(t) \quad 6$$

in the logarithmic domain, where $F'_i(t)$ is the i-th component of the unnormalized vector at time t, and where Z(t) is a weighted mean of the components of F'(t) and Z(t-1) according to Equations 7 and 8:

$$Z(t) = 0.9Z(t-1) + 0.1M(t) \quad 7$$

and where $$M(t) = \frac{1}{20} \sum_i F_i(t) \quad [8]$$

The normalized twenty dimension feature vector X(t) may be further processed by all adaptive labeler 62 to adapt to variations in pronunciation of speech sounds. An adapted twenty dimension feature vector X'(t) is generated by subtracting a twenty dimension adaptation vector A(t) from the twenty dimension feature vector X(t) provided to the input of the adaptive labeler 62. The adaptation vector A(t) at time t may, for example, be given by the formula $$A(t) = \frac{A(t-1) + k[X(t-1) - Xp(t-1)]}{(1+k)},\quad [9]$$

where k is a fixed parameter of the adaptive labeling model, X(t-1) is the normalized twenty dimension vector input to the adaptive labeler 62 at time (t-1), Xp(t-1) is the adaptation prototype vector (from adaptation prototype store 58) closest to the twenty dimension feature vector X(t-1) at time (t-1), and A(t-1) is the adaptation vector at time (t-1).

The twenty dimension adapted feature vector signal X'(t) from the adaptive labeler 62 is preferably provided to an auditory model 64. Auditory model 64 may, for example, provide a model of how the human auditory system perceives sound signals. An example of an auditory model is described in U.S. Pat. No. 4,980,918 to Bahl et al entitled "Speech Recognition System with Efficient Storage and Rapid Assembly of Phonological Graphs".

Preferably, according to the present invention, for each frequency band i of the adapted feature vector signal X'(t) at time t, the auditory model 64 calculates a new parameter $E_i(t)$ according to Equations 10 and 11:

$$E_i(t) = K_1 + K_2(X'_i(t))(N_i(t-1)) \quad 10$$

where $$N_i(t) = K_3 \times N_i(t-1) - E_i(t-1) \quad 11$$

and where $K_1$, $K_2$, and $K_3$ are fixed parameters of the auditory model.

For each centisecond time interval, the output of the auditory model 64 is a modified twenty dimension feature vector signal. This feature vector is augmented by a twenty-first dimension having a value equal to tile square root of the sum of the squares of the values of the other twenty dimensions.

For each centisecond time interval, a concatenator 66 preferably concatenates nine twenty-one dimension feature vectors representing the one current centisecond time interval, the four preceding centisecond time intervals, and the four following centisecond time intervals to form a single spliced vector of 189 dimensions. Each 189 dimension spliced vector is preferably multiplied in a rotator 68 by a rotation matrix to rotate the spliced vector and to reduce the spliced vector to fifty dimensions.

The rotation matrix used in rotator 68 may be obtained, for example, by classifying into M classes a set of 189 dimension spliced vectors obtained during a training session. The covariance matrix for all of the spliced vectors in the training set is multiplied by the inverse of the sample within covariance matrix for all of the spliced vectors in all M classes. The first fifty eigenvectors of the resulting matrix form the rotation matrix. (See, for example, "Vector Quantization Procedure For Speech Recognition Systems Using Discrete Parameter Phoneme-Based Markov Word Models" by L. R. Bahl, et al, *IBM Technical Disclosure Bulletin*, Volume 32, No. 7, December 1989, pages 320 and 321.)

Window generator 50, spectrum analyzer 52, adaptive noise cancellation processor 54, short term mean normalization processor 60, adaptive labeler 62, auditory model 64, concatenator 66, and rotator 68, may be suitably programmed special purpose or general purpose digital signal processors. Prototype stores 56 and 58 may be electronic computer memory.

We claim:

1. A speech coding apparatus comprising:
   means for storing a model of a training script, said training script model comprising a series of elementary models from a finite set of elementary models, each elementary model in the training script having a phonetic context comprising one or more preceding or following models in the training script;
   means for measuring the value of at least one feature of a training utterance of the training script over each of a series of successive time intervals for producing a series of training feature vector signals representing feature values;

means for identifying a first set of training feature vector signals corresponding to a first elementary model in the training script model;

means for storing at least a first reference vector signal and a second reference vector signal, each reference vector signal having at least one parameter value, the first reference vector signal comprising the arithmetic mean of the training feature vector signals corresponding to the first elementary model in a first phonetic context of preceding and following phonetic models, the second reference vector signal comprising the arithmetic mean of the training feature vector signals corresponding to the first elementary model in a second phonetic context of preceding and following phonetic models, different from the first context;

means for comparing the feature values of each training feature vector signal in the first set to said at least one parameter value of the first reference vector signal to obtain a first closeness score for each training feature vector signal and the first reference vector signal;

means for comparing the feature values of each training feature vector signal in the first set to said at least one parameter value of the second reference vector signal to obtain a second closeness score for each training feature vector signal and the second reference vector signal;

means for comparing, for each training feature vector signal in the first set, the first closeness score for the training feature vector signal with the second closeness score for the training feature vector signal to obtain a reference match score for each training feature vector signal and the first and second reference vector signals;

means for storing a first subset of the training feature vector signals in the first set having reference match scores greater than a threshold Q, and for storing a second subset of the training feature vector signals in the first set having reference match scores less than the threshold Q; and means for generating one or more partition values for a first prototype vector signal from the first subset of training feature vector signals, and for generating one or more additional partition values for the first prototype vector signal from the second subset of training feature vector signals.

2. A speech coding apparatus as claimed in claim 1, wherein:

the first set of training feature vector signals corresponds to the first elementary model in the training script model in a first phonetic context.

3. A speech coding apparatus as claimed in claim 2, further comprising:

means for identifying a second set of training feature vector signals corresponding to a second elementary model in the training script model and means for identifying a third set of training feature vector signals corresponding to a third elementary model in the training script model;

said at least one parameter value of the first reference vector signal comprises an arithmetic mean of the feature values of the second set of training feature vector signals corresponding to the second elementary model in the training script in a second context; and said at least one parameter value of the second reference vector signal comprises an arithmetic mean of the feature values of the third set of training feature vector signals corresponding to the third elementary model in the training script in a third context different from the first and second contexts.

4. A speech coding apparatus as claimed in claim 3, wherein the means for generating one or more partition values comprises means for grouping each subset of training feature vector signals into one or more different clusters.

5. A speech coding apparatus as claimed in claim 4, wherein:

the means for grouping each subset of training feature vector signals into one or more different clusters further comprises:

means for storing at least a third reference vector signal and a fourth reference vector signal, each reference vector signal having at least one parameter value;

means for comparing the feature values of each training feature vector signal in the first subset to said at least one parameter value of the third reference vector signal to obtain a third closeness score for the training feature vector signal and the third reference vector signal;

means for comparing the feature values of each training feature vector signal in the first subset to said at least one parameter value of the fourth reference vector signal to obtain a fourth closeness score for the training feature vector signal and the fourth reference vector signal;

means for comparing, for each training feature vector signal in the first subset, the third closeness score for the training feature vector signal with the fourth closeness score for the training feature vector signal to obtain a sub-reference match score for each training feature vector signal and the third and fourth reference vector signals; and means for storing a first sub-subset of the training feature vector signals in the first subset having sub-reference match scores greater than a threshold Q', and for storing a second sub-subset of the training feature vector signals in the first subset having sub-reference match scores less than the threshold Q'; and the means for generating one or more partition values generates one or more partition values for the first prototype vector signal from the first sub-subset of training feature vector signals, and generates one or more additional partition values for the first prototype vector signal from the second sub-subset of training feature vector signals.

6. A speech coding apparatus as claimed in claim 5, wherein each partition value comprises the arithmetic mean of the feature values of the training feature vector signals in one of the clusters.

7. A speech coding apparatus as claimed in claim 6, wherein each partition value further comprises a variance of the feature values of the training feature vector signals in one of the clusters.

8. A speech coding apparatus as claimed in claim 7, wherein the threshold Q is equal to one.

9. A speech coding apparatus as claimed in claim 1, wherein the means for collecting comprises a microphone.

10. A speech coding method comprising:

storing a model of a training script, said training script model comprising a series of elementary models from a finite set of elementary models, each elementary model in the training script having a phonetic context comprising one or more preceding or following models in the training script;

measuring the value of at least one feature of a training utterance of the training script over each of a series of successive time intervals for producing a series of training feature vector signals representing the feature values;

identifying a first set of training feature vector signals corresponding to a first elementary model in the training script model;

storing at least a first reference vector signal and a second reference vector signal, each reference vector signal having at least one parameter value, the first reference vector signal comprising the arithmetic mean of the training feature vector signals corresponding to the first elementary model in a first phonetic context of preceding and following phonetic models, the second reference vector signal comprising the arithmetic mean of the training feature vector signals corresponding to the first elementary model in a second phonetic context of preceding and following phonetic models, different from the first context;

comparing the feature values of each training feature vector signal in the first set to said at least one parameter value of the first reference vector signal to obtain a first closeness score for each training feature vector signal and the first reference vector signal;

comparing the feature values of each training feature vector signal in the first set to said at least one parameter value of the second reference vector signal to obtain a second closeness score for each training feature vector signal and the second reference vector signal;

comparing, for each training feature vector signal in the first set, the first closeness score for the training feature vector signal with the second closeness score for the training feature vector signal to obtain a reference match score for each training feature vector signal and the first and second reference vector signals;

storing a first subset of the training feature vector signals in the first set having reference match scores greater than a threshold Q, and storing a second subset of the training feature vector signals in the first set having reference match scores less than the threshold Q; and generating one or more partition values for a first prototype vector signal from the first subset of training feature vector signals, and for generating one or more additional partition values for the first prototype vector signal from the second subset of training feature vector signals.

11. A speech coding method as claimed in claim 10, wherein:

the first set of training feature vector signals corresponds to the first elementary model in the training script model in a first phonetic context.

12. A speech coding method as claimed in claim 11, further comprising steps of:

identifying a second set of training feature vector signals corresponding to a second elementary model in the training script model; and identifying a third set of training feature vector signals corresponding to a third elementary model in the training script model;

said at least one parameter value of the first reference vector signal comprises an arithmetic mean of the feature values of the second set of training feature vector signals corresponding to the second elementary model in the training script in a second context; and said at least one parameter value of the second reference vector signal comprises an arithmetic mean of the feature values of the third set of training feature vector signals corresponding to the third elementary model in the training script in a third context different from the first and second contexts.

13. A speech coding method as claimed in claim 12, wherein the step of generating one or more partition values comprises the step of grouping each subset of training feature vector signals into one or more different clusters.

14. A speech coding method as claimed in claim 13, wherein:

the step of grouping each subset of training feature vector signals into one or more different clusters further comprises:

storing at least a third reference vector signal and a fourth reference vector signal, each reference vector signal having at least one parameter value;

comparing the feature values of each training feature vector signal in the first subset to said at least one parameter value of the third reference vector signal to obtain a third closeness score for the training feature vector signal and the third reference vector signal;

comparing the feature values of each training feature vector signal in the first subset to said at least one parameter value of the fourth reference vector signal to obtain a fourth closeness score for the training feature vector signal and the fourth reference vector signal;

comparing, for each training feature vector signal in the first subset, the third closeness score for the training feature vector signal with the fourth closeness score for the training feature vector signal to obtain a sub-reference match score for each training feature vector signal and the third and fourth reference vector signals; and storing a first sub-subset of the training feature vector signals in the first subset having sub-reference match scores greater than a threshold Q', and storing a second sub-subset of the training feature vector signals in the first subset having sub-reference match scores less than the threshold Q'; and wherein the step of generating one or more partition values generates one or more partition values for the first prototype vector signal from the first sub-subset of training feature vector signals, and generates one or more additional partition values for the first prototype vector signal from the second sub-subset of training feature vector signals.

15. A speech coding method as claimed in claim 14, wherein each partition value comprises the arithmetic mean of the feature values of the training feature vector signals in one of the clusters.

16. A speech coding method as claimed in claim 15, wherein each partition value further comprises a variance of the feature values of the training feature vector signals in one of the clusters.

17. A speech coding method as claimed in claim 16, wherein the threshold Q is equal to one.

\* \* \* \* \*